March 11, 1958

J. T. HELLYER 2,826,389

AUTOMATIC HOT WATER WEIGHER

Filed Sept. 10, 1956

INVENTOR:
John T. Hellyer,
BY Bair, Freeman & Molinare
ATTORNEYS.

March 11, 1958  J. T. HELLYER  2,826,389
AUTOMATIC HOT WATER WEIGHER
Filed Sept. 10, 1956  3 Sheets-Sheet 3

INVENTOR:
John T. Hellyer,
BY Bair, Freemont & Molinare
ATTORNEYS.

United States Patent Office 2,826,389
Patented Mar. 11, 1958

2,826,389

AUTOMATIC HOT WATER WEIGHER

John T. Hellyer, Wayne, Ill., assignor of one-half to Robert S. Strom, Wheaton, Ill.

Application September 10, 1956, Serial No. 608,757

9 Claims. (Cl. 249—2)

The present invention relates to a liquid dispenser, such as by way of example and not limitation, a hot water tank and heater assembly. Such dispensers may be utilized for dispensing various liquids, and are especially suitable for use in restaurants, lunch counters and in commercial establishments for supplying hot water in making various beverages, such as coffee, tea, hot chocolate, soup, bouillon, etc.

In supplying hot water for making instant coffee, brewed coffee, tea, hot chocolate and the like the temperature of the water desirably should be in the range of 205° F. or higher, in order to efficiently produce beverage of a highly satisfactory flavor and taste. When water of lower temperature is used, the quality of flavor and taste of the beverage is greatly reduced or impaired. Hot water heaters as currently available for brewing beverages and the like in restaurants, etc., are of various types. One widely used type of hot water heater employs a stationary tank vented to atmosphere and having a valve for the inlet water supply. Such hot water heaters are not constructed to provide for expansion of the water incident to heating and, hence, after each cycle of operation (i. e., withdrawal of a quantity of hot water), the water in the tank must be brought up to a predetermined temperature and the residual heat from the heating element tends to keep the water boiling and expanding, resulting in a substantial amount of dripping of hot water after each withdrawal from the tank. Such a condition is highly objectionable as well as hazardous. Moreover, because there is no provision in such water heaters for accommodating expansion of the hot water, and due to the dripping of water from the tank incident to use, it is not always possible to continuously maintain the water in the tank at a desired, predetermined high temperature.

One of the objects of the present invention is to provide a novel form of liquid dispenser comprising a stationary tank, provided with a discharge spout, continuously vented to atmosphere, with its inlet end located above the normal liquid level in the tank, and in connection to a source of liquid supply, together with means for controlling the liquid supply incident to the operation of means for displacing liquid in the tank to raise the level of the liquid to approximate registration with the inlet end of the spout.

Another object is to provide a novel hot water heater of the character indicated having a stationary tank and a continuously open discharge spout connected to the upper portion of the tank, with its inlet end positioned above the normal water level in the tank, a water supply conduit operably connected to the tank, and a normally closed valve connected in the conduit, together with manually operable means for displacing water in the tank to raise the water level to approximate registrations with the inlet end of the spout and simultaneously opening said valve for causing discharge of hot water through the spout.

A further object of this invention is to provide a novel hot water heater of the character indicated having a stationary tank provided with a continuously open discharge spout at its upper end, with its inlet end located above the normal water level in the tank, manually operable means for displacing water in the tank for raising the water level to approximate registration with the inlet opening of the spout, means for latching the displaceable means in operative position and simultaneously supplying water to the tank to discharge water through the spout, together with a scale mechanism, including a receptacle receiving platform adapted to be moved when a predetermined quantity of water is discharged into the receptacle, for releasing the latching means and restoring the displaceable means to initial position and simultaneously shutting off the water supply and discontinuing the discharge of water from the spout, and causing lowering of the water level to a plane below the inlet end of the spout.

It is also an object of the present invention to provide a novel construction of hot water heater of the character indicated which eliminates all dripping of hot water incident to the expansion of hot water while it is being heated in the tank.

It is still another object of this invention to provide a novel hot water heater of the character indicated which is simple in construction, economical to manufacture, safe to use, and which permits obtaining a continuous supply of hot water at a substantially constant predetermined temperature.

Other objects and advantages of this invention will be apparent from the following description, taken in connection with the accompanying drawings, in which:

Figure 4 is a wiring diagram of the electrical circuit for the hot water heater embodying the present invention.

Figure 1:
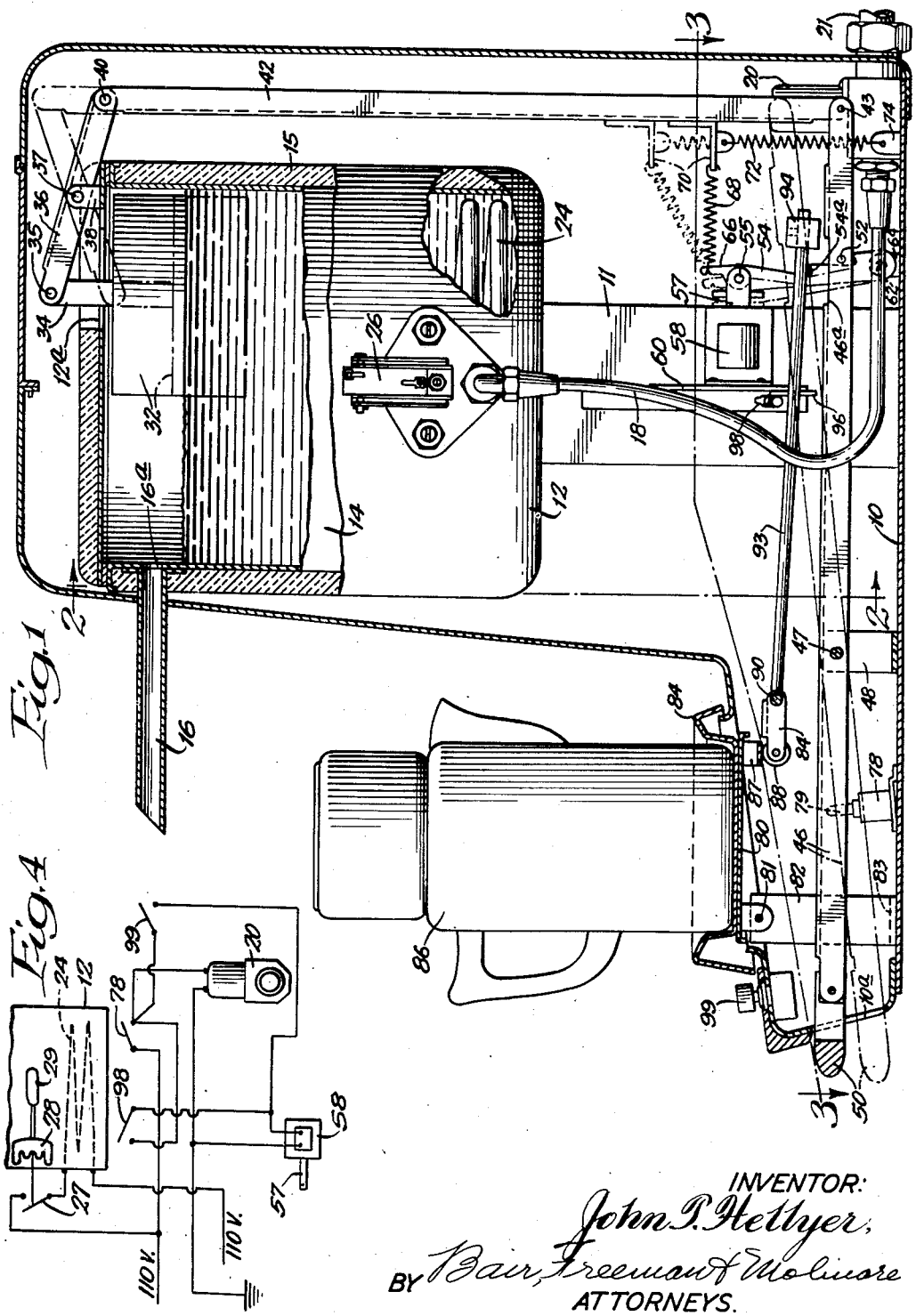
Figure 1 is a side elevational view of the novel hot water heater embodying the present invention, including automatic mechanism for controlling the discharge of a predetermined quantity of hot water.

The hot water heater represented in the drawings is of the automatic type and includes a main support or base 10, on which is mounted in spaced-apart relation, a pair of upright standards 11. The upper end of each of the standards is rigidly connected to the bottom of an upright hot water storage tank 12. The tank may be of various sizes and shapes, and as herein shown, is circular in cross section. The tank comprises an inner metallic shell 14, totally surrounded by suitable heat insulating material as indicated at 15. Connected into the side wall of the tank, adjacent its upper end, is a liquid discharge spout 16, which normally serves to provide continuous atmospheric venting for the upper portion of the tank. The inlet end 16a of the spout is located a substantial distance above the normal water level in the tank, as may be seen in Figure 1 of the drawings. A suitable cold water supply conduit 18, is operably connected at one end with the lower portion of the tank, and the opposite end of the conduit is connected to a normally closed solenoid valve 20, and the latter is connected by a suitable conduit 21, to a source of cold water supply. It is to be understood that the connection of the conduit 18 into the lower portion of the tank is such as to permit introduction of water into the tank approximately parallel to the bottom of said tank, so that the cold water, as it is introduced into the tank, tends to remain at the bottom of the tank and assume a strata formation with respect to water in the tank that has been previously heated.

Mounted in the bottom portion of the tank is an electrical heating element 24, which is preferably of the type that will produce a relatively high rate of heat exchange for rapidly increasing the temperature of the water in the tank to a predetermined temperature. The water in the tank preferably should be heated to 205° F., or higher, when the hot water is to be used for making certain beverages, such as coffee, tea and the like. For controlling the temperature of the water in the tank, I provide a suitable thermostat of conventional form as indicated generally at 26, comprising a switch as indicated at 27, together with a pressure responsive diaphragm as indicated at 28, and a temperature sensitive bulb as indicated at 29, positioned in the tank.

Mounted in the upper portion of the tank 12, is a displaceable body 32, which may be solid or hollow. The body is adapted to be moved downwardly into the water for raising the level of the water in the tank to approximate registration with the inlet end 16a of the discharge spout 16. It is to be understood that the volume of the displaceable body 32 may be of a size so that the water level need not be accurately registered with respect to the inlet opening of the spout. In other words, the water level, when raised, may be slightly below the inlet opening of the spout, and the apparatus will still function properly. It is preferable, of course, if the water level is brought into resignation with the inlet opening of the spout.

Connected to the displaceable body 32, is an upwardly extending support 34, which passes through a suitable opening 12a in the top of the tank. Support 34 is pivotally connected at 35 to a lever arm 36 which, in turn, is pivoted at 37 to a bracket 38, secured to the top of the tank. The outer end of the arm 36 is pivotally connected at 40 to a vertically extending lever member 42, and the lower end of said lever 42 is pivotally connected at 43 to a main, horizontally extending, manually operated lever 46. The main operating lever is pivotally connected at 47, intermediate its length, in a bracket 48, secured to the base or support 10. The free end of the main operating lever is provided with a hand-engaging portion 50, extending through an opening 10a in the front wall of the base or support 10, as clearly seen in Figure 1 of the drawings.

Figure 2:
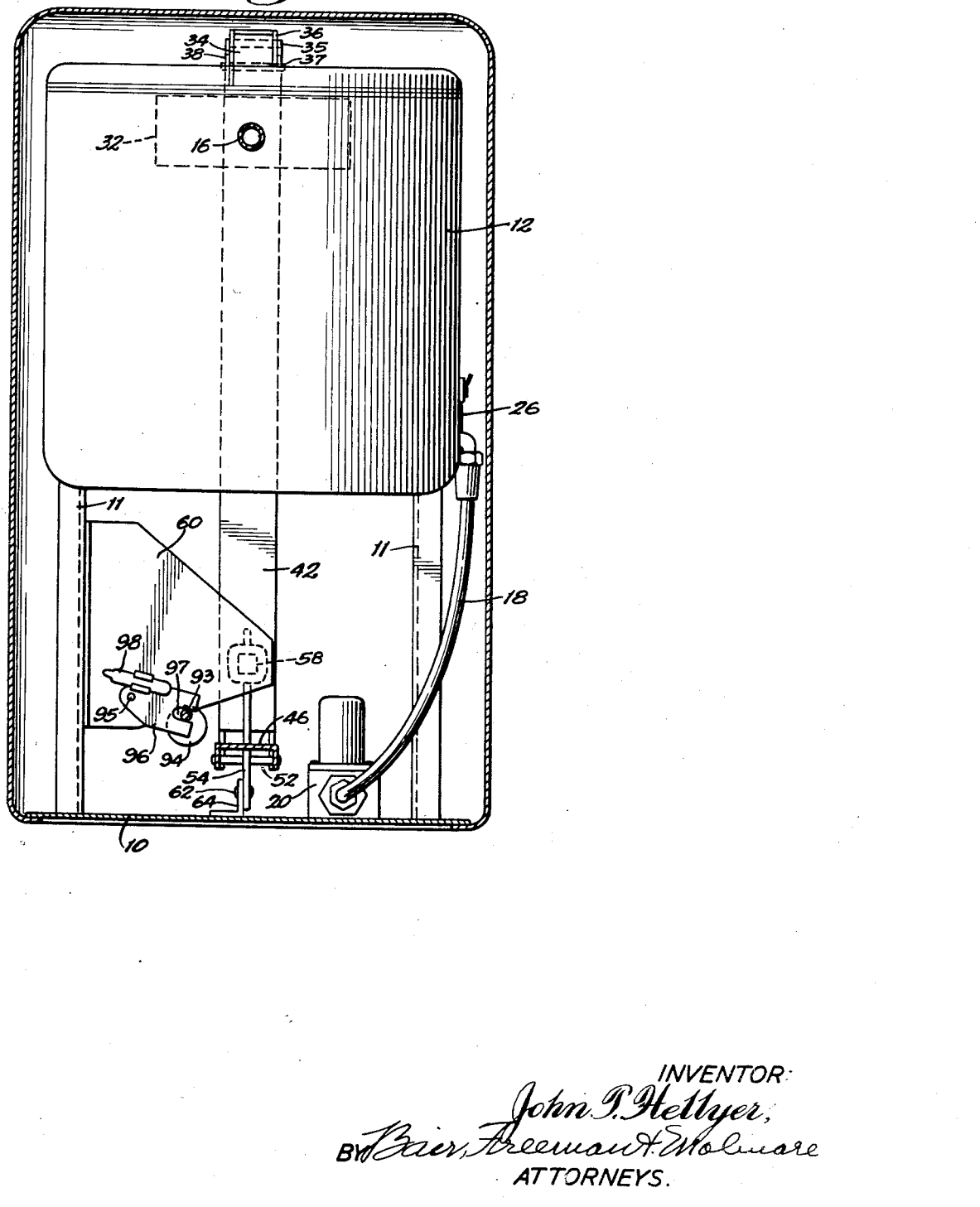
Figure 2 is a vertical sectional view, taken substantially as indicated at line 2—2 on Figure 1.
Figure 3:
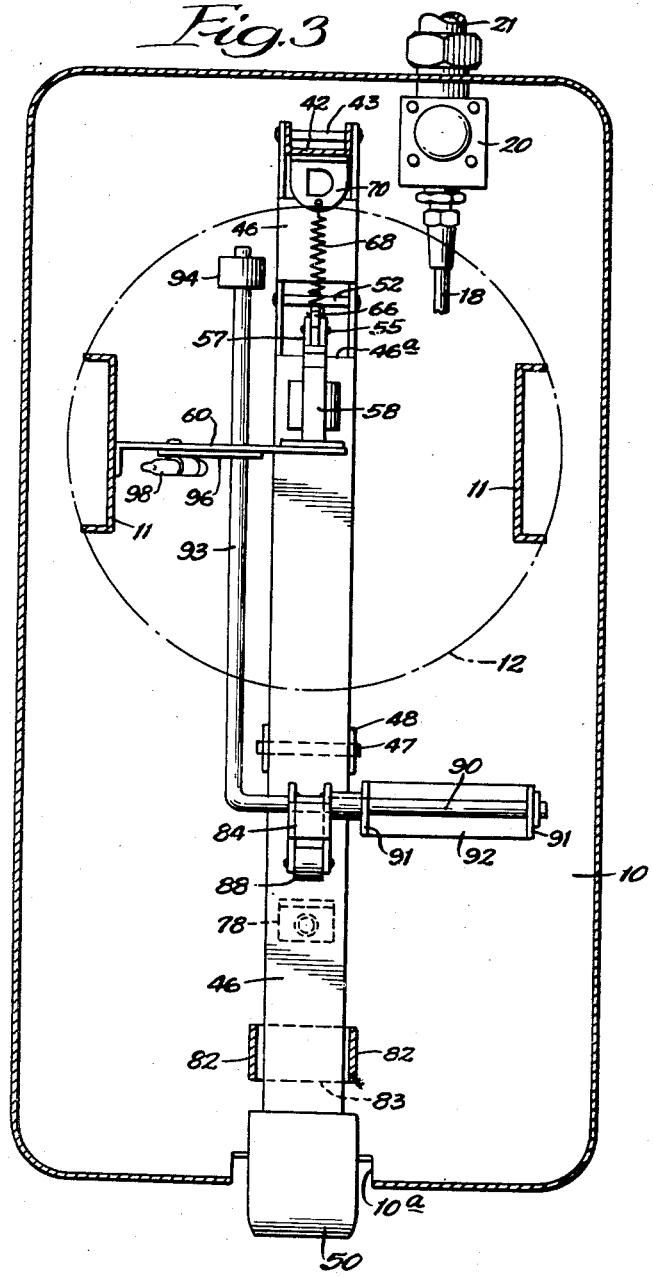
Figure 3 is a horizontal sectional view through the heater, taken substantially as indicated at line 3—3 on Figure 1.

The main operating lever 46 is of inverted U-shape in cross section and has a portion of its upper surface, as indicated at 46a, cut away, and the side walls of said operating lever, immediately below the cut away top wall, are interconnected by a pin 52. A latch member 54 is pivotally mounted at 55 on the outer end of the plunger 57 of a solenotid 58. The solenoid is rigidly attached to a vertically disposed sheet metal bracket 60 which, in turn, is secured to one of the upright standards 11, as clearly seen in Figure 2 of the drawings. The latch member includes a depending portion extending through the open top of the main operating lever 46, between the side walls thereof, and has its lower end pivoted, as indicated at 62, in a bracket 64 fixedly secured to the base 10. The latch member includes a lug 66, extending upwardly beyond its pivot 55, and is connected to one end of a coil spring 68. The opposite end of said spring is connected to a bracket 70, secured to the upwardly extending lever 42. A second coil spring 72 is connected at one end to the bracket 70, and the opposite end being attached to a lug 74, secured to the support 10.

The spring 68, when the solenoid 58 is de-energized, serves to withdraw the plunger 57 of the solenoid in an outwardly direction, and thereby move the latch member 54, about its pivot 62 to the full line position seen in Figure 1 of the drawings. Such movement of the latch member by the spring 68, is limited by the latch member engaging the pin 52 of the main operating lever 46. The purpose of the spring 72 is to normally restore the linkage 46—42—36, together with the displaceable body 32, to the full line position, when the latch member has been moved to its full line position, as seen in Figure 1 of the drawings.

When the main operating lever 46 is depressed by manual engagement of the outer end 50 thereof, to assume the dot-and-dash line position seen in Figure 1 of the drawings, motion is transmitted through the linkage (comprising the levers 46—42—36) so as to cause the displaceable body 32 to be moved downwardly into the body of water, and thereby displacing the same and causing the level of the water to be raised into approximate registration with the inlet end of the discharge spout 16.

When the linkage has been moved, as above described, the pin 52, carried on the rear portion of the operating lever 46, is moved upwardly, and is caused to engage in an arcuate, upwardly open seat 54a of the latch member 54, by virtue of which the linkage becomes latched in such adjusted position with the displaceable body 32 positioned, as indicated by the dot-and-dash outline, in the water within the tank. The linkage is permitted to return to its normal full line position, and the displaceable body 32 raised relative to the water in the tank, when the solenoid 58 is energized, as hereinafter described.

Mounted on the base 10 is a switch 78, having a spring pressed plunger 79, positioned in engagement with the under side of the top wall of the main operating lever 46, forwardly of the pivotal mounting of said lever. Said switch 78 is normally open when the main operating lever is in the full line position seen in Figure 1 of the drawings, and is adapted to be closed when the main operating lever is moved to the dot-and-dash outline position, as seen in Figure 1 of the drawings.

In the construction illustrated in the drawings, a suitable scale mechanism is provided by virtue of which it is possible to dispense measured quantities of hot water from the tank into a receptacle or decanter after the main operating lever 46 has been actuated. The scale mechanism comprises a receptacle receiving platform 80, pivotally mounted at 81, adjacent its forward end, on spaced-apart upright arms 82, of a support bracket 83, which is secured to the base 10. The upper surface of the platform is provided with a dish-shaped receptacle 84, providing a recessed portion for centering and providing a seat for the bottom of a receptacle, such as a two piece combination receptacle, indicated generally at 86, in the nature of a drip type coffee maker.

As is well understood, the uppermost receptacle of the coffee maker is adapted to contain ground coffee so that when hot water is introduced therein the liquid filters through the ground coffee into the lower receptacle. Coffee brewed in this manner is usually referred to as drip type coffee.

The rear portion of the under side of the platform 80 is provided with a depending U-shaped bracket 87, seated upon a roller 88, carried on the forward end of an operating arm 89 which, in turn, is rigidly connected at its rear end on a horizontal, transversely extending rock shaft 90. The rock shaft is journaled in upright legs 91, of a U-shaped mounting bracket 92, which is secured on the main base or support 10. Said rock shaft continues into a rearwardly extending weight arm, as indicated at 93, on the rear end portion of which is mounted a weight 94. A weight 94 is fixedly positioned along the arm 93 so as to counterbalance the weight of the receptacle on the platform 80, together with the predetermined amount of water to be introduced into the receptacle. The platform and weight arm initially assume the position shown in full lines in Figure 1 of the drawings, and when the receptacle on the platform 80, has been filled with a predetermined quantity of water, the weighing mechanism is actuated, causing downward movement of the rearward portion of the platform, about the pivot 81, and causing upward movement of the rear end of the weight arm. It is by virtue of such action that dispensing of water from the tank into the receptacle is immediately discontinued, as will be presently described.

Pivotally mounted, as indicated at 95, on the vertically disposed bracket 60, is a plate 96, which is formed at one end with a U-shaped notch 97, positioned in straddled relation to the weight arm 93, so that vertical movement of the weight arm about the axis of the rock shaft 90, swings the plate 96 about its pivot 95. Carried on the plate 96 is a normally open mercury-type switch 98, which is caused to be closed when the plate 96 is swung upwardly by the action of the weight arm 93.

The electrical wiring diagram, shown in Figure 4 of the drawings, indicates the manner in which the two normally open switches 78 and 98, are connected in circuit with the solenoid water valve 20, and the latching solenoid 58. The diagram also includes the electrical heater circuit for the hot water tank.

Operation

When the tank 12 is filled with water to a level as indicated in Figure 1 of the drawings, and the heating element 24 is connected in the electrical circuit as illustrated in Figure 4 of the drawings, the thermostat serves to control the heating element 24 so as to maintain the water in the tank at a predetermined temperature. When a decanter or other receptacle is placed on the movable platform 80, the main operating lever 50 is then depressed to the dot-and-dash outline position seen in Figure 1 of the drawings, thereby causing the displaceable body 32 to be moved downwardly into the water in the tank for raising the level of the water to approximate registration with the inlet end of the spout 16, as above described. Such downward movement of the main operating lever closes the switch 78, thereby energizing the solenoid valve 20 for opening said valve and admitting a fresh supply of water to the bottom of the tank, thereby causing discharge of the hot water from the tank through the spout 16 into the decanter or receptacle. When the main operating lever has been so moved, its pin 52 engages the seat 54a of the latch 54, and secures the linkage in such position of adjustment, and thereby maintains the displaceable body 32 at its downward position of movement in the water in the tank until the latch member 54 is disengaged by energization of the solenoid 58.

After the receptacle or decanter has been filled with a predetermined amount of hot water, as determined by the setting of the weight 94 on the weight arm 93, the weighing mechanism is actuated, causing downward movement of the platform 80 about the pivot 81, as a result of the weight of the decanter or receptacle, together with the weight of the predetermined water introduced therein. Such movement of the platform raises the weight arm, which in turn moves the plate 96 about its pivot 95, for closing the mercury switch 98. When the mercury switch 98 is closed, an electrical circuit is completed to energize the solenoid 58, causing its plunger 57 to be retracted, and thereby moving the latch member 54 to the dot-and-dash outline position seen in Figure 1. Such movement of the latch member disengages the pin 52 of the main operating lever 46 from its seat 54a, permitting the main operating lever and its associated linkage, together with the displaceable body 32, under influence of spring 72, to again assume its initial position, as seen in full lines in Figure 1 of the drawings, causing the water level in the tank to be lowered a substantial distance below the inlet opening of the spout 16.

As the main operating lever 46 approaches its full line position seen in Figure 1, switch 78 is caused to be opened, and thereby de-energizes the solenoid valve 20, causing it to assume a closed position, and thereby discontinues the supply of water to the tank 12. It will be apparent that the water supply is shut off substantially simultaneously with the return movement of the linkage and displaceable body 32 to its initial position of adjustment. It will also be apparent that when switch 78 is opened, the branch electrical circuit for the solenoid 58 is likewise simultaneously broken, causing the latch 54 to return to its initial position under influence of spring 68.

When the receptacle or decanter containing the predetermined quantity of hot water discharged from the tank is removed from the platform 80, said platform 80 and weight arm 93 again assume the position shown in full lines in Figure 1 of the drawings, and all electrical circuits, except possibly the heater circuit, remain broken.

In order that the apparatus herein described may be conveniently used, manually, for dispensing unmeasured quantities of hot water, such as into a cup or other receptacle not supported on the platform 80, I provide a push-button switch 99, connected in a shunt electrical circuit for controlling operation of the latching solenoid 58. For such use, the cup or receptacle is held in proper position beneath the discharge end of the spout 16, and the main operating lever is depressed to the dot-and-dash outline position, by virtue of which the linkage causes movement of the displaceable body 32 into the water in the tank and, simultaneously, closes switch 78, energizing the solenoid valve 20 to admit water to the tank and thereby causes dispensing of hot water from the tank into the cup or receptacle. When a desired amount of hot water has been withdrawn from the tank, the push-button switch 99 is depressed to complete the shunt circuit to the latching solenoid 58, causing the solenoid to be energized, and thereby moving the latch member 54, out of blocking engagement with the pin 52 of the main operating lever 46, permitting said lever and its associated linkage, together with the displaceable body 32, to again return to its initial position of adjustment under influence of the spring 72. When this occurs, the switch 78 assumes an open position, causing instantaneous de-energization of the solenoid valve 20, resulting in closing of the valve and de-energization of the latch solenoid 58 so that all electrical circuits, excepting possibly the heater circuit, are broken even if the push-button switch 99 is held in closed position.

By virtue of the construction embodying the present invention, it is apparent that when the apparatus is not functioning for dispensing of hot water, the supply of hot water in the tank is maintained at a predetermined temperature. Furthermore, the construction is such that even though the volume of the hot water in the tank, as a result of heating, is caused to expand, such expansion is readily accommodated due to the fact that at such time the level of the water in the tank is substantially below the inlet end of the discharge spout 16. It will also be apparent that by virtue of the present invention all possibility of dripping of hot water, incident to either expansion or dispensing of hot water, is totally eliminated.

While I have herein shown and described a construction by virtue of which dispensing of measured quantities of liquid from a tank may be attained automatically, it will be apparent that by dispensing with the latching mechanism, including the latching solenoid, and all electrical circuits, the apparatus could be manually operated through the linkage herein described, together with a mechanical connection from the linkage to a water supply valve for controlling the valve incident to operation of the linkage. Such apparatus could also be used where the liquid, to be dispensed, such as a beverage, need not be heated, and the tank, if desired, could be cooled in a suitable manner.

Although I have herein shown and described certain preferred embodiments of my invention, manifestly it is capable of further modification and rearrangement without departing from the spirit and scope thereof. I do not, therefore, wish to be understood as limiting this invention to the precise embodiment herein disclosed, except as I may be so limited by the appended claims.

I claim:

1. A liquid dispenser comprising a stationary tank adapted to contain liquid, a continuously open discharge spout connected in communication with the upper portion of the tank with the inlet end positioned above the normal liquid level in the tank, a liquid supply conduit operably connected to the tank, normally closed valve means for controlling liquid flow through the conduit, manually operable means adapted when actuated for displacing liquid in the tank to raise the liquid level therein to approximate registration with the inlet end of said spout, and means operable in direct response to actuation of said manually operable means for moving said valve means to open position for admitting liquid into the tank and thereby effecting discharge of liquid through the spout.

2. A liquid dispenser comprising a stationary tank adapted to contain liquid, a continuously open discharge spout connected in communication with the upper portion of the tank with the inlet end positioned above the normal liquid level in the tank, a liquid supply conduit operably connected to the tank, normally closed valve means for controlling liquid flow through the conduit, manually operable means adapted when actuated for displacing liquid in the tank to raise the liquid level therein to approximate registration with the inlet end of said spout, and means operable in direct response to actuation of said manually operable means for moving said valve means to open position for admitting liquid into the tank and thereby effecting discharge of liquid through the spout, said manually operable means upon return to its initial inoperative position effecting closure of the valve means and lowering of the liquid level in the tank below said inlet end of the discharge spout for discontinuing the discharge of liquid through the spout.

3. A liquid dispenser comprising a stationary tank adapted to contain liquid, a continuously open discharge spout connected in communication with the upper portion of the tank with the inlet end positioned above the normal liquid level in the tank, a liquid supply conduit operably connected to the tank, normally closed valve means for controlling liquid flow through the conduit, manually operable means, including linkage, adapted when actuated for displacing liquid in the tank to raise the liquid level therein to approximate registration with the inlet end of said spout, latching means for automatically locking said linkage in an operative position, and means operable in direct response to actuation of said manually operable means for moving said valve means to open position for admitting liquid into the tank and thereby effecting discharge of liquid through the spout.

4. A liquid dispenser comprising a stationary tank adapted to contain liquid, a continuously open discharge spout connected in communication with the upper portion of the tank with the inlet end positioned above the normal liquid level in the tank, a liquid supply conduit operably connected to the tank, normally closed valve means for controlling liquid flow through the conduit, manually operable means, including linkage, adapted when actuated for displacing liquid in the tank to raise the liquid level therein to approximate registration with the inlet end of said spout, latching means for automatically locking said linkage in an operative position, means operable in direct response to actuation of said manually operable means for moving said valve means to open position for admitting liquid into the tank and thereby effecting discharge of liquid through the spout, and means for releasing said latching means.

5. A liquid dispenser comprising a stationary tank adapted to contain liquid, a continuously open discharge spout connected in communication with the upper portion of the tank with the inlet end positioned above the normal liquid level in the tank, a liquid supply conduit operably connected to the tank, normally closed valve means for controlling liquid flow through the conduit, manually operable means, including linkage, adapted when actuated for displacing liquid in the tank to raise the liquid level therein to approximate registration with the inlet end of said spout, latching means for automatically locking said linkage in an operative position, means operable in direct response to actuation of said manually operable means for moving said valve means to open position for admitting liquid into the tank and thereby effecting discharge of liquid through the spout, means for disengaging said latch means, and spring means returning said manually operable means to initial inoperative position upon disengagement of said latch means and simultaneously closing said valve means, whereby to lower the level of the liquid in the tank below said inlet opening of the spout.

6. A liquid dispenser comprising a stationary tank adapted to contain liquid, a continuously open discharge spout connected in communication with the upper portion of the tank with the inlet end positioned above the normal liquid level in the tank, a liquid supply conduit operably connected to the tank, normally closed valve means for controlling liquid flow through the conduit, manually operable means, including linkage, adapted when actuated for displacing liquid in the tank to raise the liquid level therein to approximate registration with the inlet end of said spout, latching means for automatically locking said linkage in an operative position, means operable in direct response to actuation of said manually operable means for moving said valve means to open position for admitting liquid into the tank and thereby effecting discharge of liquid through the spout, means for disengaging said latch means, spring means for returning said manually operable means to initial inoperative position upon disengagement of said latch means and simultaneously closing said valve means, whereby to lower the level of the liquid in the tank below said inlet opening of the spout, weighing mechanism including a movable platform for supporting a receptacle beneath the discharge end of the spout, said mechanism being actuated in direct response to the discharge of a predetermined quantity of liquid into the receptacle for causing disengagement of said latch means and simultaneously effecting closure of said valve means, and spring means for urging said manually operable displaceable means to initial inoperative position, whereby to lower the level of the liquid in the tank below said inlet end of the spout.

7. A liquid dispenser comprising a stationary tank adapted to contain liquid, a continuously open discharge spout connected in communication with the upper portion of the tank with the inlet end positioned above the normal liquid level in the tank, a liquid supply conduit operably connected to the tank, normally closed valve means for controlling liquid flow through the conduit, manually operable means adapted when actuated for displacing liquid in the tank to raise the liquid level therein to approximate registration with the inlet end of said spout, said displaceable means comprising linkage, a manually movable lever and a body carried in the upper end of the tank and movable into and out of the liquid in the tank, and means operable in direct response to actuation of said manually operable means for moving said valve means to open position for admitting liquid into the tank and thereby effecting discharge of liquid through the spout.

8. A hot water dispenser comprising a stationary tank adapted to contain water, a continuously open discharge spout connected in open communication with the upper portion of the tank with the inlet end positioned above the normal water level in the tank, thermostatically controlled means for heating the water in the tank, a water supply conduit operably connected to the tank, normally closed valve means for controlling flow through the conduit into the tank, manually operable means for displacing water in the tank to raise the water level to approximate registration with the inlet end of the spout, and means operable in direct response to actuation of said manually operable means for opening the water valve to admit fresh water to the tank for raising the liquid level therein and causing hot water to be discharged through said spout.

9. A hot water dispenser comprising a stationary tank adapted to contain water, a continuously open discharge spout connected in open communication with the upper portion of the tank with the inlet end positioned above the normal water level in the tank, thermostatically controlled means for heating the water in the tank, a water supply conduit operably connected to the tank, normally closed valve means for controlling flow through the conduit into the tank, manually operable means for displacing water in the tank to raise the water level to approximate registration with the inlet end of the spout, means operable in direct response to actuation of said manually operable means for opening the water valve to admit fresh water to the tank for raising the liquid level therein and causing hot water to be discharged through said spout, and spring means for urging said manually operable means to its initial inoperative position for effecting closure of the water valve and lowering of the water level in the tank below said inlet end of the discharge spout for discontinuing the discharge of hot water through the spout.

No references cited.